United States Patent
Schutt et al.

(10) Patent No.: US 11,229,969 B2
(45) Date of Patent: Jan. 25, 2022

(54) BRAZED FIFTH WHEEL HITCH ASSEMBLY COMPONENTS AND METHOD OF CONSTRUCTING SAME

(71) Applicant: SAF-HOLLAND, Inc., Muskegon, MI (US)

(72) Inventors: Randy Schutt, Holland, MI (US); Brian E. Ainsworth, Ada, MI (US)

(73) Assignee: SAF-Holland, Inc., Muskegon, MI (US)

( * ) Notice: Subject to any disclaimer, the term of this patent is extended or adjusted under 35 U.S.C. 154(b) by 517 days.

(21) Appl. No.: 16/137,137

(22) Filed: Sep. 20, 2018

(65) Prior Publication Data
US 2019/0084065 A1   Mar. 21, 2019

Related U.S. Application Data

(60) Provisional application No. 62/561,338, filed on Sep. 21, 2017.

(51) Int. Cl.
| | |
|---|---|
| *B23K 1/00* | (2006.01) |
| *B62D 53/08* | (2006.01) |
| *B60D 1/01* | (2006.01) |
| *B62D 53/10* | (2006.01) |

(52) U.S. Cl.
CPC .......... *B23K 1/0008* (2013.01); *B23K 1/0004* (2013.01); *B60D 1/015* (2013.01); *B62D 53/08* (2013.01); *B62D 53/10* (2013.01)

(58) Field of Classification Search
CPC .... B23K 1/0004; B23K 1/0008; B23K 3/053; B23K 35/001; B62D 53/08; B62D 53/10; B60D 1/015; Y10T 428/12493

USPC .......................................................... 428/615
See application file for complete search history.

(56) References Cited

U.S. PATENT DOCUMENTS

| | | | | |
|---|---|---|---|---|
| 2,466,194 A | * | 4/1949 | Anderson | B62D 13/02 |
| | | | | 280/81.6 |
| 2,694,852 A | | 11/1954 | Rogers | |
| 2,906,544 A | * | 9/1959 | Watts | B60D 1/345 |
| | | | | 280/406.2 |
| 3,263,950 A | * | 8/1966 | Terlecky | B61D 45/008 |
| | | | | 410/60 |
| 3,512,803 A | * | 5/1970 | Hines | B62D 53/0878 |
| | | | | 280/432 |
| 3,529,851 A | * | 9/1970 | Hines | B62D 53/0878 |
| | | | | 280/432 |
| 3,680,201 A | | 8/1972 | McGregor | |
| 3,847,228 A | * | 11/1974 | Slosiarek | A01B 59/041 |
| | | | | 172/450 |

(Continued)

*Primary Examiner* — Kevin Hurley
*Assistant Examiner* — Maurice L Williams
(74) *Attorney, Agent, or Firm* — Price Heneveld LLP

(57) ABSTRACT

A brazing connection includes a first component comprising a first material and including a first connection portion, a second component comprising a second material and including a second connection portion, a heating element that is electrically conductive and electrically resistant positioned between the first connection portion of the first component and the second connection portion of the second component, where the heating element is configured to transmit heat when conducting an electrical current, and a brazing material configured to melt when receiving heat from the heating element, thereby connecting the first component to the second component.

17 Claims, 4 Drawing Sheets

(56) References Cited

U.S. PATENT DOCUMENTS

| | | | |
|---|---|---|---|
| 4,032,057 A | 6/1977 | Linscott, Jr. | |
| 5,303,947 A * | 4/1994 | Gerber | B62D 53/0828 280/423.1 |
| 5,503,423 A * | 4/1996 | Roberts | B60D 1/40 280/479.2 |
| 5,671,938 A * | 9/1997 | Olson | B60D 1/00 280/416.1 |
| 6,391,476 B2 | 5/2002 | Wittebrood et al. | |
| 6,465,113 B2 | 10/2002 | Yamada et al. | |
| 6,485,046 B1 * | 11/2002 | Hsueh | B60D 1/065 280/455.1 |
| 6,555,251 B2 | 4/2003 | Kilmer | |
| 6,701,997 B2 | 3/2004 | Gellert et al. | |
| 10,071,445 B2 | 9/2018 | Campbell et al. | |
| 2009/0101238 A1 | 4/2009 | Jossick et al. | |
| 2010/0224672 A1 * | 9/2010 | Mortimer | B23K 1/0008 228/164 |
| 2011/0109063 A1 * | 5/2011 | Fudala | B60D 1/485 280/497 |
| 2014/0008893 A1 * | 1/2014 | Loukus | B60D 1/015 280/433 |
| 2014/0097159 A1 * | 4/2014 | Belnap | B23K 1/19 219/85.22 |
| 2014/0239631 A1 * | 8/2014 | Takahashi | F16L 33/10 285/253 |
| 2015/0158535 A1 * | 6/2015 | Alldredge | B62D 53/0885 280/434 |
| 2015/0211194 A1 * | 7/2015 | Petersen | F16J 15/16 404/122 |
| 2015/0224835 A1 * | 8/2015 | Ehrlich | B60D 1/015 280/423.1 |
| 2016/0008916 A1 * | 1/2016 | Yoshioka | B23K 11/087 428/615 |
| 2016/0082550 A1 * | 3/2016 | Jarvis | B23K 20/021 428/615 |
| 2017/0021602 A1 * | 1/2017 | Yang | B32B 7/12 |
| 2017/0113290 A1 * | 4/2017 | De Oliveira | B23K 1/19 |
| 2017/0158269 A1 * | 6/2017 | Marchione | B23K 26/38 |
| 2017/0239757 A1 * | 8/2017 | Bruck | B23K 1/0008 |
| 2018/0117674 A1 * | 5/2018 | Cavaliere | B23K 35/268 |
| 2018/0236580 A1 * | 8/2018 | Kolbe | E21B 34/06 |
| 2018/0238481 A1 * | 8/2018 | Lecoester | F16L 41/084 |
| 2019/0299727 A1 * | 10/2019 | Fenton | B60D 1/605 |
| 2020/0001405 A1 * | 1/2020 | Murphy | B32B 15/20 |
| 2020/0239070 A1 * | 7/2020 | Koster | B62D 15/023 |

* cited by examiner

BRAZED FIFTH WHEEL HITCH ASSEMBLY COMPONENTS AND METHOD OF CONSTRUCTING SAME

CROSS REFERENCE TO RELATED APPLICATIONS

This application claims the benefit is U.S. Provisional Patent Application No. 62/561,338, filed on Sep. 21, 2017, entitled "BRAZED FIFTH WHEEL HITCH ASSEMBLY COMPONENTS AND METHOD OF CONSTRUCTING SAME," the entire disclosures of which are incorporated herein by reference.

BACKGROUND OF THE INVENTION

The present invention relates to a brazed component and a method of constructing the same, and in particular to a brazed fifth wheel hitch assembly component and a method of constructing the same, such as a fifth wheel hitch assembly locking jaw configured to lock a kingpin typically associated with a towed vehicle such as a semi-trailer, within a fifth wheel hitch plate typically associated with a towing vehicle such as a semi-tractor.

BRIEF SUMMARY OF THE INVENTION

One embodiment includes a brazing connection that includes a first component comprising a first material and including a first connection portion, a second component comprising a second material and including a second connection portion, a heating element that is electrically conductive and electrically resistant positioned between the first connection portion of the first component and the second connection portion of the second component, where the heating element is configured to transmit heat when conducting an electrical current, and a brazing material configured to melt when receiving heat from the heating element, thereby connecting the first component to the second component.

Another embodiment includes a method for forming a brazing connection that includes providing a first component that comprises a first material and includes a first connection portion, providing a second component that comprises a second material and includes a second connection portion, providing a heating element that is electrically conductive and electrically resistant, wherein the heating element is configured to transmit heat when conducting an electrical current, and providing a brazing material configured to melt when receiving heat from the heating element. The embodiment further includes positioning the heating element between the first connection portion of the first component and the second connection portion of the second component, positioning the brazing material between the first connection portion of the first component and the second connection portion of the second component, and connecting the first component the second component by conducting an electrical current through the heating element and melting the brazing material.

Yet another embodiment includes a fifth wheel hitch assembly locking jaw that includes a locking jaw comprising a first material and including a first connection surface, a wear plate comprising a second material and including a second connection surface and an abutment surface, wherein the abutment surface is configured to abut a kingpin of a fifth wheel hitch assembly, a heating element that is electrically conductive and electrically resistant positioned between the first connection surface of the locking jaw and the second connection surface of the wear plate, where the heating element is configured to transmit heat when conducting an electrical current, and a brazing material configured to melt when receiving heat from the heating element, thereby connecting the locking jaw the wear plate.

The principal objects of the embodiments as shown and described herein provide an efficient and exacting method for constructing fifth wheel hitch plate assembly components via a brazing process, wherein the components are more durable, and may be produced via relatively less expensive manufacturing methods. These components are economical to manufacture, result in an extended operating life, and are particularly well adapted for the proposed use. The methods as described herein may further be utilized to manufacture components other than those utilized within fifth wheel hitch assemblies, or heavy-duty transportation components in general.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
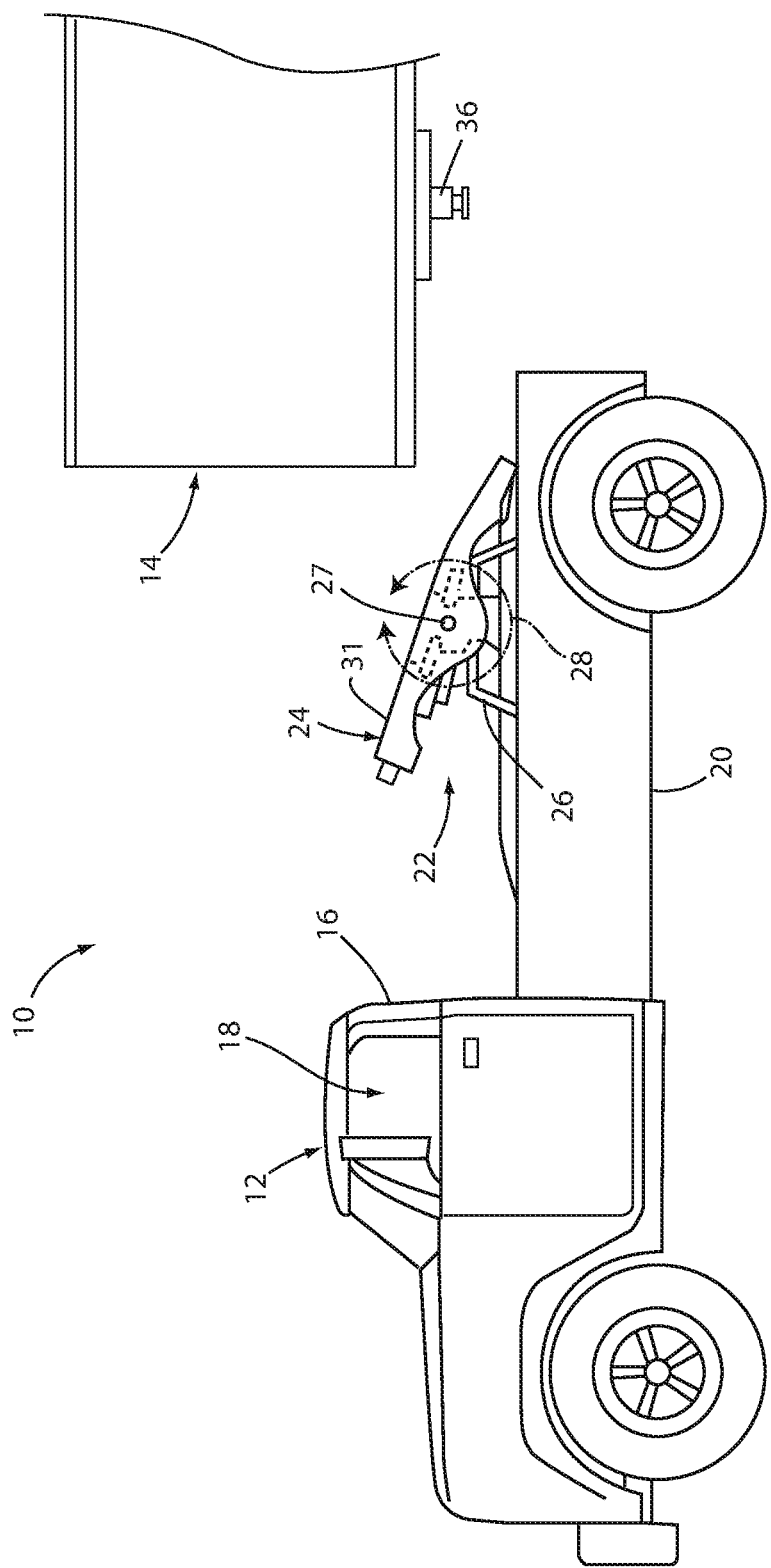
FIG. 1 is a side elevational schematic view of a truck and trailer combination including a fifth wheel hitch assembly.
Figure 2:
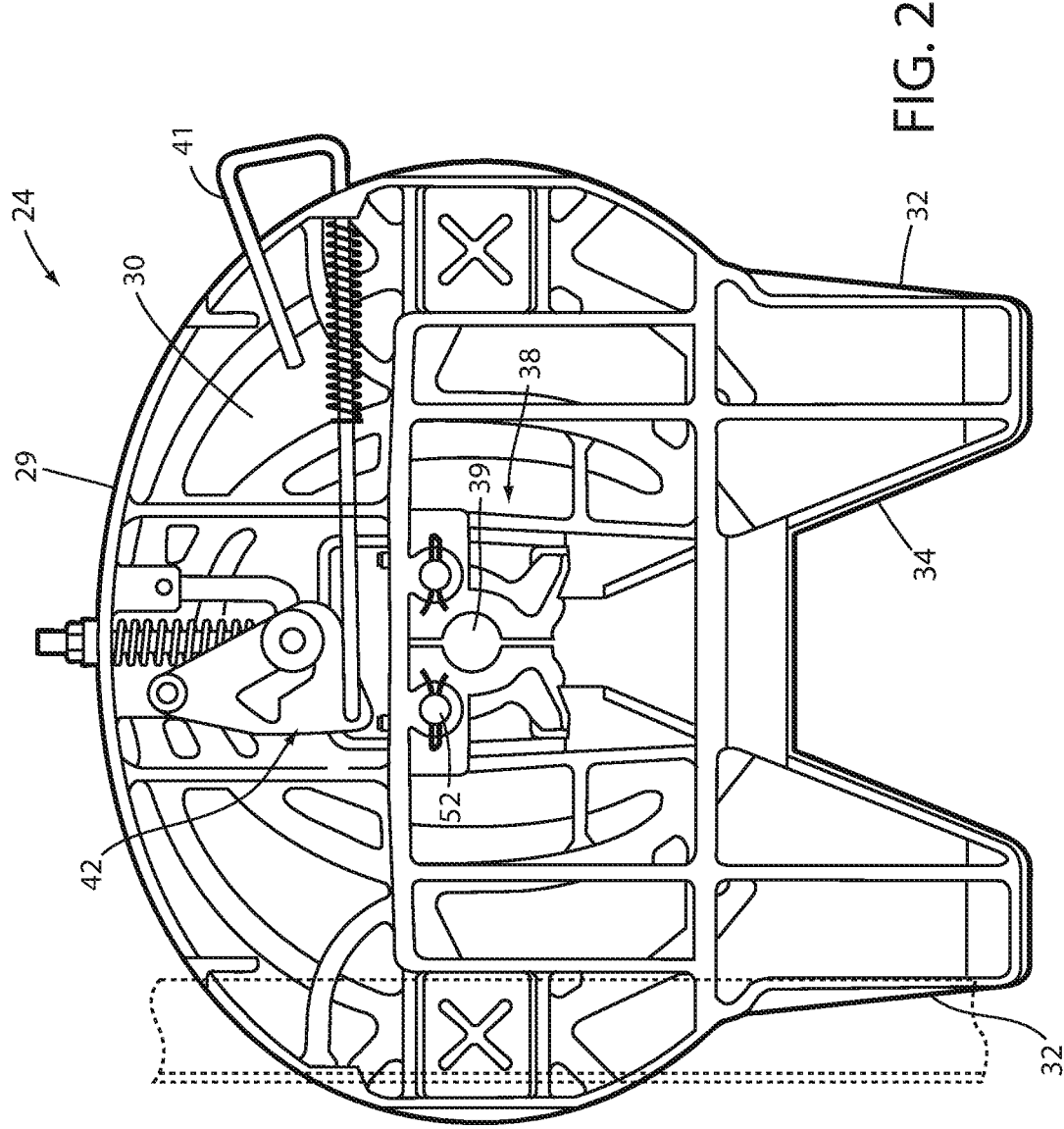
FIG. 2 is a bottom elevational view of the fifth wheel hitch plate assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the embodiments as shown and described herein may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference 10 (FIG. 1) generally designates a tractor/trailer vehicle combination, including a towing vehicle 12, such as a semi-tractor, and a towed vehicle or trailer 14. In the illustrated example, the towing vehicle 12 includes a cab 16 defining an interior space 18, and a rearwardly-extending frame assembly 20 supporting a fifth wheel hitch assembly 22 thereon. The fifth wheel hitch assembly 22 includes a fifth wheel hitch plate arrangement 24 pivotably supported above the frame assembly 20 by a mounting arrangement 26 such that the fifth wheel hitch plate arrangement 24 is pivotable about a pivot axis 27 in the directions 28. The fifth wheel hitch plate arrangement 24 (FIG. 2) includes a hitch plate 29 having a planar body portion 30 with a top support surface 31, and a pair rearwardly-extending flanges 32 defining a throat 34 therebetween that is adapted to receive a kingpin 36 (FIG. 1) of the trailer 14 therein.

The fifth wheel hitch assembly 22 further includes a locking arrangement 38 movable between a locked position, such as that illustrated in FIG. 2, wherein the kingpin 36 is secured within a locking region 39 of the throat 34, and an unlocked position (not shown), wherein the kingpin may be moved into and removed from the throat 34 of the hitch plate arrangement 24. The locking arrangement 38 may be configured to be moved between the locked position and the unlocked position either manually via an engagement/release handle 41 operably coupled to the locking arrangement 38 via a linkage assembly in a manner well known in the art, and/or via a mechanical assistance, such as via a pneumatic cylinder assembly, electric actuators, various gear trains and the like.

Figure 3:
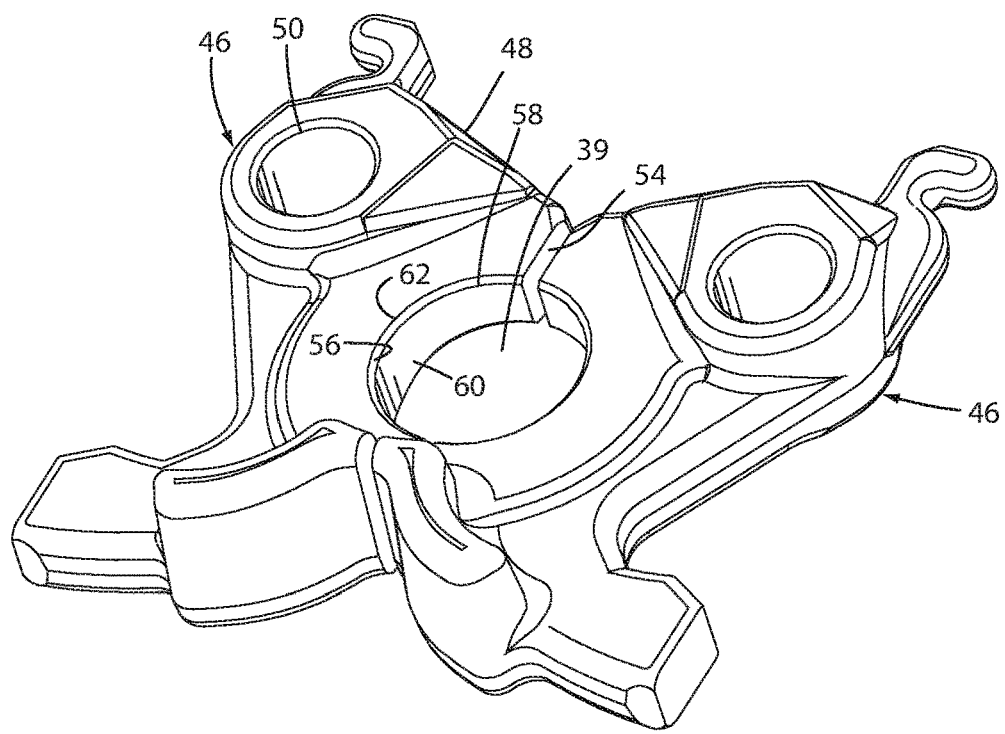
FIG. 3 is a perspective view of locking jaws of the fifth wheel hitch plate assembly.

In the illustrated example, the locking arrangement 38 includes a pair of locking jaws 46 (FIG. 3) that cooperate to define the locking region 39. Each locking jaw 46 includes a body portion 48 that includes an aperture 50 receiving a pin 52 pivotably coupling the locking jaw 46 with the fifth wheel hitch plate 29, and an interface 54 that includes a recess or first connection portion 56. In the illustrated example, each locking jaw 46 further includes an arcuately-shaped wear plate 58 that includes an inwardly-facing kingpin abutment surface 60 and an outer surface or second connection portion 62. In the illustrated example, the body portion 48 or substrate of each locking jaw 46 comprises a first metal such as a relatively low cost steel such as a low carbon steel that can provide a high strength steel forging, while the wear plate or clad 58 comprises a high wear second metal such as T1 steel, aluminum bronze, silicon bronze, phosphor bronze, and the like. This arrangement provides a reduced cost for manufacturing the body portion 48 of the locking jaw 46, while simultaneously providing an increased wear life of the overall locking jaw 46 by providing the wear plate 48 in the position where the locking jaw 46 abuts the kingpin 36 during operation of the tractor/trailer vehicle combination 10. It is noted that the locking arrangement 38 and specifically the locking jaws 46 thereof is only an example of potential applications to which the present inventive brazing method could be applied.

Figure 4:
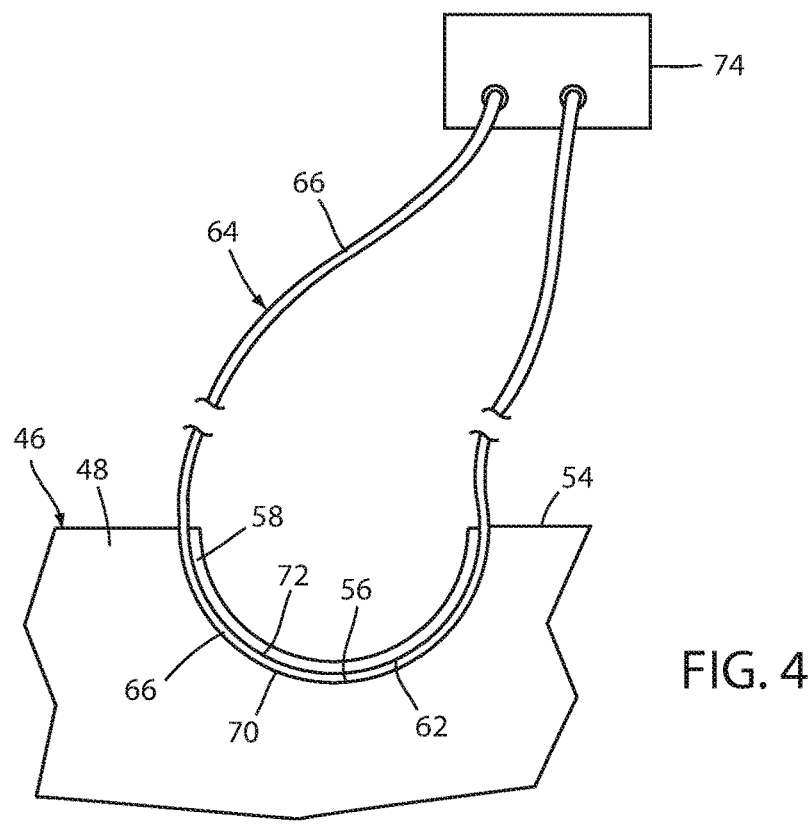
FIG. 4 is a schematic view of a brazing arrangement for a fifth wheel hitch assembly component.
Figure 5:
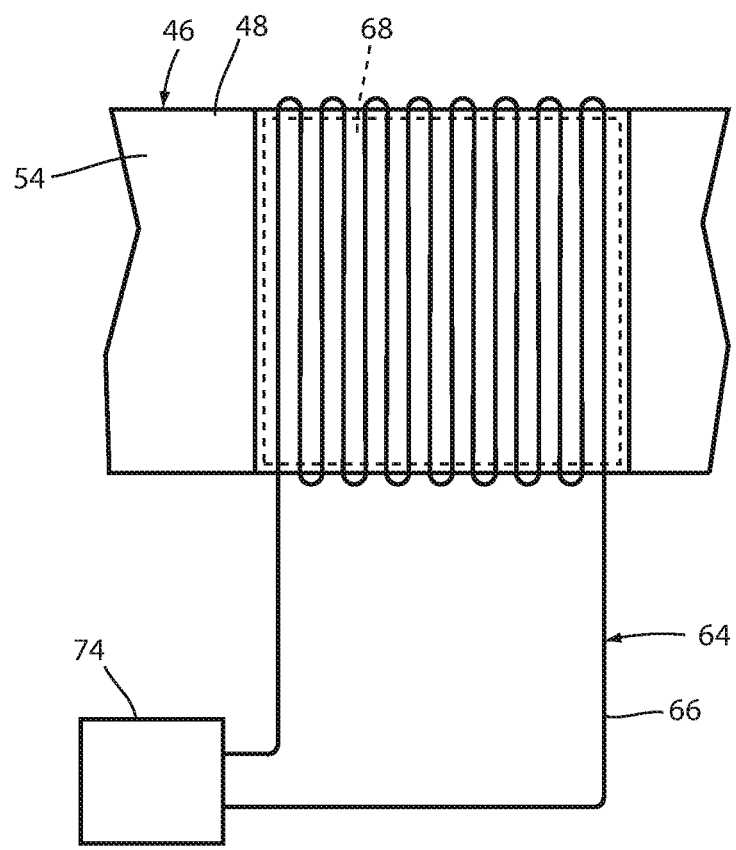
FIG. 5 is a top schematic view of the brazing arrangement for the fifth wheel hitch assembly component.
Figure 6:
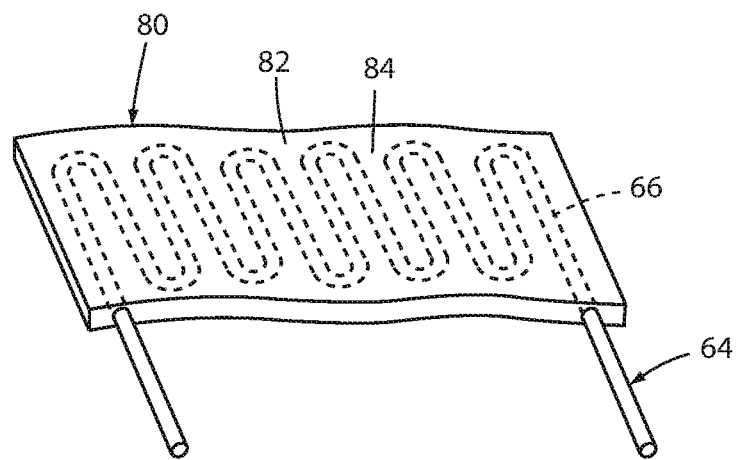
FIG. 6 is a perspective view of a brazing pad.

In the embodiment as illustrated, the wear plate 58 is attached to the body portion 48 of the locking jaw 46 via a brazing operation. In the example as illustrated in FIGS. 4 and 5, a paste 68 including a brazing or filler material, such as silver based solders, silver/tin based compounds and brazing compounds known in the art, and a flux material is applied to either the first connection portion 56 and/or the second connection portion 52. A heating element 64 in the form of an electrically conductive and electrically resilient wire 66 such as a nichrome wire is provided. The wire 66 is coupled to a power source 74 that is configured to conduct an electrical current through the wire 66. The heating element 64 is configured to heat when an electrical current is passed therethrough, thereby raising the temperature thereof. The wire 66 is then positioned within the recess or first connection portion 56 of the body portion 48 of the locking jaw 46. As best illustrated in FIG. 5, the wire 66 may be patterned in such a manner such that the wire 66 makes multiple passes between the body portion 48 and the wear plate 58. The wear plate 58 is then positioned within the recess 56 of the body portion 48 such that the interface 54 of the first connection portion 56 contacts an inner surface 70 of the wire 66, and the outer surface or second connection portion 62 contacts an outer surface 72 of the wire 66, such that the wire 66 provides a preferred spacing between the two components being brazed together, namely, the body portion 48 of the locking jaw 46 and the wear plate 58. In the illustrated example, the wire 66 preferably has a thickness or diameter of less than or equal to about 0.040 inches, more preferably of within the range of from about 0.003 inches to about 0.010 inches, and most preferably of within the range of from about 0.005 inches to about 0.007 inches. Of course, other configurations and thicknesses of the heating element 64 may be utilized depending on the particular application.

The heating element 64 then melts the brazing material and flux material of the paste 68, such that the brazing material reaches a liquid state and the flux causes the brazing material to properly flow between the body portion 48, whereupon the brazing material cools and joins the body portion 48 and the wear plate 58.

In another alternative embodiment, the heating element 64 in the form of the insulated wire 66 is provided within a single-piece flexible sheet or pad 80 that includes the brazing material 82 and the flux material 84 therein, thereby eliminating the need to apply the brazing material and/or the flux material as a paste. Of course, the brazing sheet or pad 80 may be sized to fit a particular connection configuration or geometry. Alternatively, the sheet or pad 80 may be oversized with respect to the connection area between the parts to be connected, thereby requiring the flash of the brazing material 82 and the heating element 64 extending beyond the connection area to be trimmed subsequent to brazing. Similar to the examples discussed above, the width or diameter of the heating element 64 may be utilized to space the parts to be connected to one another from one another to provide a proper brazing connection.

In an alternative embodiment, the heating element 64 is provided in the form of a wire, such as a nichrome wire, coated with an insulating material, such as a ceramic. In this embodiment, the ceramic outer insulating material may serve to electrically insulate the heating element 64 from the substrate and clad. An alternative application of the present invention includes a method that includes positioning the insulated wire 66 within the recess or first connection portion 56 of the body portion 48 of the locking jaw 46. Again, the wire 66 may be patterned in such a manner such that the wire 66 makes multiple passes between the body portion 48 and the wear plate 58. The paste 68 is then applied to either the first connection portion 56 and/or the second connection portion 52. The wear plate 58 is then positioned within the recess 56 of the body portion 48 such that the interface 54 of the first connection portion 56 contacts an inner surface 70 of the wire 66, and the outer surface or second connection portion 62 contacts an outer surface 72 of the wire 66, such that the wire 66 provides a preferred spacing between the two components being brazed together, namely, the body portion 48 of the locking jaw 46 and the wear plate 58. As previously described, the wire 66 is coupled to the power source 74 that is configured to conduct an electrical current through the wire 66. The heating element 64 is heated by an electrical current that is passed therethrough, thereby raising the temperature and melting the brazing material and flux material of the paste 68. Once the desired temperature has been reached and the brazing material reaches a liquid state, the flux causes the brazing material to properly flow between the body portion 48, whereupon the electrical current is removed from the wire 66 and the brazing material cools and joins the body portion 48 and the wear plate 58.

The embodiments as shown and described herein provide an efficient and exacting method for constructing fifth wheel hitch plate assembly components via a brazing process, wherein the components are more durable, and may be produced via relatively less expensive manufacturing methods. These components are economical to manufacture, result in an extended operating life, and are particularly well adapted for the proposed use. The methods as described herein may further be utilized to manufacture components other than those utilized within fifth wheel hitch assemblies, or heavy-duty transportation components in general.

In the foregoing discussion, it will be readily appreciated by those skilled in the art that modifications may be made to the illustrative embodiments as disclosed herein. Such modifications are to be considered as included in the following claims, unless these claims by the language expressly state otherwise.

The invention claimed is:

1. A fifth wheel hitch assembly locking jaw, comprising:
   a locking jaw comprising a first material and including a first connection surface;
   a wear plate comprising a second material and including a second connection surface and an abutment surface, wherein the abutment surface is configured to abut a kingpin of a fifth wheel hitch assembly;
   a heating element that is electrically conductive and electrically resistant positioned between the first connection surface of the locking jaw and the second connection surface of the wear plate, where the heating element is configured to transmit heat when conducting an electrical current; and
   a brazing material seperate from the heating element and configured to melt when receiving heat from the heating element, thereby connecting the locking jaw the wear plate and such that the heating element remains between the locking jaw and the wear plate.

2. The fifth wheel hitch assembly locking jaw of claim 1, wherein the heating element contacts the first connection surface of the locking jaw and the second connection surface of the wear plate, thereby spacing the second connection surface from the first connection surface.

3. The fifth wheel hitch assembly locking jaw of claim 1, wherein the heating element includes a wire.

4. The fifth wheel hitch assembly locking jaw of claim 1, wherein the heating element includes a continuous length, and wherein the heating element is configured to make multiple passes between the first connection surface and the second connection surface.

5. The fifth wheel hitch assembly locking jaw of claim 1, wherein the brazing material comprises a paste.

6. The fifth wheel hitch assembly locking jaw of claim 5, wherein the paste includes a flux material.

7. The fifth wheel hitch assembly locking jaw of claim 1, wherein the second material is different than the first material.

8. The fifth wheel hitch assembly locking jaw of claim 1, wherein the heating element includes an electrically conductive portion and an insulating portion positioned between the electrically conductive portion and at least one of the first connection portion and the second connection portion.

9. The fifth wheel hitch assembly locking jaw of claim 1, wherein the heating element has a thickness of less than or equal to about 0.040 inches.

10. The fifth wheel hitch assembly locking jaw of claim 9, wherein the thickness of the heating element is between about 0.003 inches and about 0.010 inches.

11. The fifth wheel hitch assembly locking jaw of claim 10, wherein the thickness of the heating element is between about 0.005 inches and about 0.007 inches.

12. The fifth wheel hitch assembly locking jaw of claim 1, wherein the first connection portion includes a recess, and wherein the second connection portion is received within the recess.

13. The fifth wheel hitch assembly locking jaw of claim 1, wherein the brazing material and the heating element cooperate to form a mat.

14. The fifth wheel hitch assembly locking jaw of claim 13, wherein the mat is flexible.

15. The fifth wheel hitch assembly locking jaw of claim 13, wherein the mat is includes a flux material.

16. A method for forming a brazing connection, comprising:
   providing the fifth wheel assembly locking jaw of claim 1;
   positioning the heating element between the first connection surface of the locking jaw and the second connection surface of the wear plate;
   heating the heating element by conducting an electrical current through the heating element; and
   connecting the locking jaw and the wear plate by melting the brazing material with the heating element such that the heating element remains between the locking jaw and the wear plate subsequent to connecting the locking jaw and the wear plate.

17. The method for forming the brazing connection of claim 16, wherein the heating element is not substantially defined during the heating of the heating element.

\* \* \* \* \*

UNITED STATES PATENT AND TRADEMARK OFFICE
CERTIFICATE OF CORRECTION

| | | |
|---|---|---|
| PATENT NO. | : 11,229,969 B2 | |
| APPLICATION NO. | : 16/137137 | |
| DATED | : January 25, 2022 | |
| INVENTOR(S) | : Randy Schutt et al. | |

It is certified that error appears in the above-identified patent and that said Letters Patent is hereby corrected as shown below:

In the Specification

Column 1, Line 8:
"is" should be — of —

Column 1, Line 57 (first occurrence):
After "component" insert -- to --

Column 2, Line 6:
After "jaw" insert -- to --

Column 3, Line 1:
After "pair" insert -- of --

Column 3, Line 41:
"jaws" should be — jaw —

Column 5, Line 16:
"the" should be — their —

In the Claims

Column 5, Claim 1, Line 34:
After "jaw" insert -- to --

Column 6, Claim 15, Line 30:
Delete "is"

Signed and Sealed this
Seventeenth Day of May, 2022

Katherine Kelly Vidal
*Director of the United States Patent and Trademark Office*